US011669136B1

(12) United States Patent
Ruiz, III et al.

(10) Patent No.: US 11,669,136 B1
(45) Date of Patent: Jun. 6, 2023

(54) SYSTEMS AND METHODS FOR AUTOMATICALLY STARTING WORKPLACE COMPUTING DEVICES

(71) Applicant: United Services Automobile Association (USAA), San Antonio, TX (US)

(72) Inventors: Adalberto Ruiz, III, Fair Oaks Ranch, TX (US); Heidi Jane Swanson, Fair Oaks Ranch, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 17/374,769

(22) Filed: Jul. 13, 2021

Related U.S. Application Data

(63) Continuation of application No. 16/254,437, filed on Jan. 22, 2019, now Pat. No. 11,061,453.

(60) Provisional application No. 62/622,200, filed on Jan. 26, 2018.

(51) Int. Cl.
| | |
|---|---|
| *G06F 11/00* | (2006.01) |
| *G06F 1/26* | (2006.01) |
| *G06F 16/903* | (2019.01) |
| *G06F 9/4401* | (2018.01) |
| *G06F 11/07* | (2006.01) |
| *H04L 67/12* | (2022.01) |

(52) U.S. Cl.
CPC ............ *G06F 1/26* (2013.01); *G06F 9/4401* (2013.01); *G06F 11/0703* (2013.01); *G06F 11/0748* (2013.01); *G06F 11/0751* (2013.01); *G06F 11/0754* (2013.01); *G06F 11/0772* (2013.01); *G06F 11/0793* (2013.01); *G06F 16/90335* (2019.01); *H04L 67/12* (2013.01)

(58) Field of Classification Search
CPC ............ G06F 11/0703; G06F 11/0706; G06F 11/0709; G06F 11/0748; G06F 11/0751; G06F 11/0754; G06F 11/0772; G06F 11/0784; G06F 11/0793; G06F 1/26; G06F 9/4401; G06F 16/90335; H04L 67/12; H04L 67/125
See application file for complete search history.

(56) References Cited

U.S. PATENT DOCUMENTS

| | | |
|---|---|---|
| 6,122,746 A | 9/2000 | Nouri et al. |
| 6,202,160 B1 | 3/2001 | Sheikh et al. |
| 6,542,076 B1 | 4/2003 | Joao |
| 6,549,130 B1 | 4/2003 | Joao |
| 9,367,379 B1 | 6/2016 | Burke et al. |

(Continued)

FOREIGN PATENT DOCUMENTS

WO  WO-2011050513 A1 *  5/2011  ............. G06F 21/34

*Primary Examiner* — Anthony J Amoroso
(74) *Attorney, Agent, or Firm* — Fletcher Yoder, PC

(57) ABSTRACT

Disclosed herein are methods and systems enabling automatic powering on and off of a computer of a user when the user is within a predetermined range from the computer. When there is a startup error detected during the remote powering on process of the computer, an alert is generated and automatically transmitted to an analyst computer to resolve the startup error. The disclosed systems and methods save a lot of time for the user each day as the user does not have to wait for execution of computer startup processes and the computer is ready to use when the user arrives at a location of their computer.

20 Claims, 3 Drawing Sheets

(56) References Cited

U.S. PATENT DOCUMENTS

| | | | | |
|---|---|---|---|---|
| 10,097,543 | B2* | 10/2018 | Novack | H04L 63/0861 |
| 10,452,116 | B1* | 10/2019 | Devries | G01P 15/097 |
| 2009/0083374 | A1* | 3/2009 | Saint Clair | H04L 67/12 |
| | | | | 709/203 |
| 2013/0103749 | A1* | 4/2013 | Werth | H04L 41/0816 |
| | | | | 709/203 |
| 2014/0149592 | A1 | 5/2014 | Krishna | |
| 2014/0149599 | A1* | 5/2014 | Krishna | H04L 67/52 |
| | | | | 709/232 |
| 2016/0061600 | A1* | 3/2016 | Dharawat | G06F 1/3231 |
| | | | | 702/150 |
| 2016/0116960 | A1* | 4/2016 | Kwak | G06F 1/3231 |
| | | | | 713/323 |
| 2017/0353860 | A1 | 12/2017 | Zhang | |
| 2017/0364402 | A1 | 12/2017 | Chua et al. | |
| 2018/0300408 | A1 | 10/2018 | Kavuri | |

* cited by examiner

SYSTEMS AND METHODS FOR AUTOMATICALLY STARTING WORKPLACE COMPUTING DEVICES

CROSS-REFERENCE TO RELATED APPLICATIONS

This application is a continuation of U.S. patent application Ser. No. 16/254,437, filed on Jan. 22, 2019, which claims priority to U.S. Provisional Patent Application Ser. No. 62/622,200, filed on Jan. 26, 2018, each of which is hereby incorporated by reference in its entirety.

TECHNICAL FIELD

This application generally relates to computing devices, and more specifically to systems and methods for automatically switching on or switching off a first computing device based on an instruction from a second computing device.

BACKGROUND

When employees arrive at their offices each day, the employees must wait for their workplace computers to perform numerous startup operations before their workplace computers can be properly utilized. For instance, when the employee needs to use their computer upon arrival at the office, the employee must manually switch on the computer, then wait for the computer to power up, boot its operating system, and execute several startup tasks. The startup tasks may include updating a virus protection program or anti-spyware programs, running preliminary virus scans and security features, etc. Consequently, the employee has to wait for the computer to finish all the startup processes before the employee can access the computer.

Some of the startup programs and processes contain thousands of commands and checks, which must fall into place and work properly before the computer is online and ready for use by the user. Accordingly, an entire sequence of execution of the startup programs and processes typically takes several minutes, and much of the user's time during the execution of the startup operations and the processes is wasted waiting until their computer is ready for use.

SUMMARY

What is therefore needed is a method and a system enabling automatic and remote powering on and off of a computer of a user when the user is within a predetermined range from the computer. When there is a startup error detected during the remote powering on of the computer, an alert is generated and automatically transmitted to an analyst computer to resolve the startup error. These systems and methods save a lot of time for the user each day as the user does not have to wait for execution of computer startup processes, and the computer is ready to use when the user arrives at a location of their computer.

In one embodiment, a server-implemented method may include receiving, by a server, a notification containing a user identifier from a first device, wherein the first device is configured to generate and transmit the notification upon determining that a location associated with the first device satisfies a threshold. The server-implemented method may further include upon the server receiving the notification, querying, by the server, a system database, to determine one or more electronic identifier addresses corresponding to a second device associated with the user identifier, wherein the system database is configured to store records of a plurality of second devices associated with each of a plurality of user identifiers of a plurality of users. The server-implemented method may further include generating, by the server, a startup instruction notification comprising instructions configured to power up the second device. The server-implemented method may further include transmitting, by the server, the startup instruction notification record to an electronic identifier address of the second device to power up the second device. The server-implemented method may further include scraping, by the server, a graphical user interface of the second device to extract data displayed on the graphical user interface in response to compilation of one or more software programs installed in an operating system of the second device. The server-implemented method may further include identifying, by the server, one or more system errors associated with powering up of the second device during the powering up of the second device, wherein the one or more system errors correspond to one or more interruptions associated with the compiling of the one or more software programs installed in the operating system of the second device. The server-implemented method may further include generating, by the server, one or more alerts associated with the one or more system errors when the one or more system errors satisfies a predetermined threshold, wherein the one or more alerts comprises images captured by the second device of its user interface at a time of identification of the one or more system errors. The server-implemented method may further include transmitting, by the server, the one or more alerts to one or more analyst computing devices for correcting the one or more system errors associated with the one or more alerts. The server-implemented method may further include generating the shutdown instruction to power off and then on again, by the server, the one or more second devices upon correction of the one or more system errors.

In another embodiment, a system may include a system database and a server coupled to the system database. The server is configured to receive a notification containing a user identifier from a first device, wherein the first device is configured to generate and transmit the notification upon determining that a location associated with the first device satisfies a predetermined threshold. The server is further configured upon the server receiving the notification, to query a system database, to determine one or more electronic identifiers corresponding to a second device associated with the user identifier, wherein the system database is configured to store records of a plurality of second devices associated with each of a plurality of user identifiers of a plurality of users. The server is further configured to generate a startup instruction notification comprising instructions configured to power up the second device. The server is further configured to transmit the startup instruction notification to an electronic identifier address of the second device to power up the second device. The server is further configured scrape a graphical user interface of the second device to extract data displayed on the graphical user interface in response to compilation of one or more software programs installed in an operating system of the second device. The server is further configured to identify one or more system errors associated with powering up of the second device during the powering up of the second device, wherein the one or more system errors correspond to one or more interruptions associated with the compiling of the one or more software programs installed in the operating system of the second device. The server is further configured to generate one or more alerts associated with the one or more system errors when the one or more system errors satisfies a predetermined threshold, wherein the one or more alerts comprises images captured by the second device of its user interface at a time of identification of the one or more system errors. The server is further configured to transmit the one or more alerts to one or more analyst computing devices for further investigation and correcting the one or more system errors associated with the one or more alerts. The server is further configured to power off and then on again the one or more second devices upon correction of the one or more system errors.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
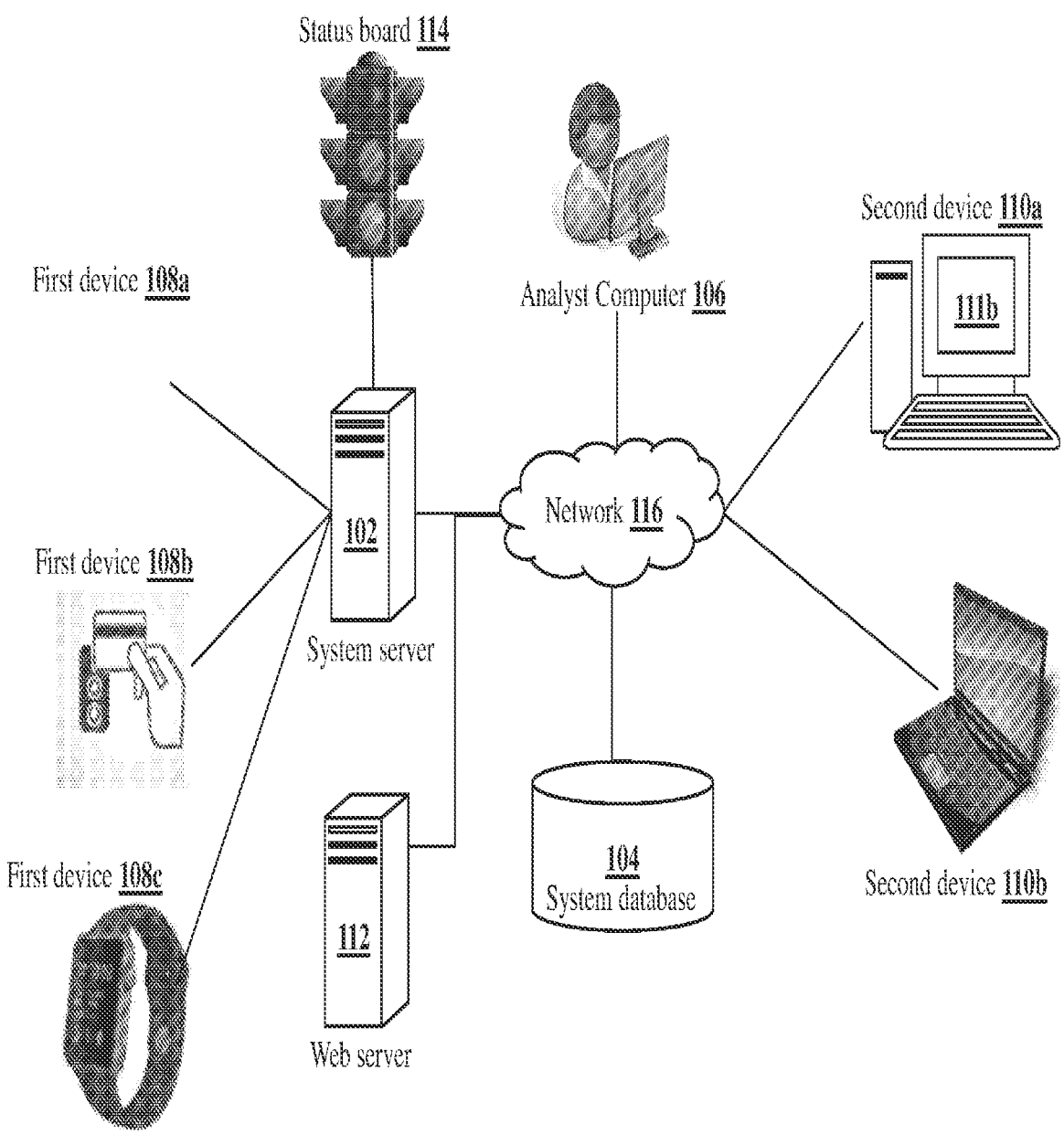
FIG. 1 shows components of an enterprise system, according to an embodiment.

Reference will now be made to the non-limiting embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present application disclosure. The illustrative embodiments described in the detailed description are not meant to be limiting of the subject matter presented here.

Systems and methods enable a user to remotely start a computer at their workplace quickly and efficiently using one of a multitude of startup devices. A startup device may communicate with the computer via a startup application to start the computer, thereby allowing the user to arrive at their workstation with the computer ready to use without delay. A startup application is created for a startup device configured to signal a remote startup (powering on) of a computer of a user. The startup device is configured to remotely transmit instructions to activate the computer, by first connecting to a network system of a company where the computer is present, which will in turn connect to the network system of the company. In return, the network system will execute the startup application on the computer, which will contain a set of computer program startup routines. The computer program startup routines may include startup routines selected by the user and the company. The computer program startup routines may reside on the computer, and the user may be able to modify the computer program startup routines on the computer. The execution of the computer program startup routines may automatically start various computer software's installed at the computer that are tailored for the user needs. Thus, upon receiving commands from the startup device, the computer is powered on and the multiple software's on the computer are running by the time the user arrives at a location of the computer within the company and logs into the computer. During the remote startup operation of the computer, when any startup process related technical problem is detected, an alert is generated. The alert includes information associated with the computer, the user, and the technical problem. The alert is automatically transmitted to an information technology (IT) team of the company via various communication channels. The alert may prompt the IT team to troubleshoot and resolve the technical problem. Since the computer is remotely switched on and any hardware/software problems associated with the computer are automatically relayed to the IT team long before the user arrives at their workstation, it saves valuable time for both the user and the company.

In one embodiment, multiple devices are integrated on a single network of a company to enable automatic powering of a first set of devices (such as computers) via commands received from a second set of devices (such as startup devices). In operation, a startup device (such as an electronic access card) may generate a startup instruction notification signal. The startup instruction notification signal is transmitted to a computer when the user enters the company using the startup device. On receipt of the startup instruction notification signal, the computer is remotely switched on. For example, when the user reaches a building of the company where the computer is present, the user may swipe the electronic access card on an access card reader located within the building. Upon swiping the electronic access card, a security network database matches an identification number associated with the electronic access card with a unique IP network identification address of the computer of the user. When there is a match, a startup instruction notification is transmitted to the computer associated with the unique IP network identification address found in the match. On receipt of the startup instruction notification signal, the computer is remotely switched on and software's within the computer are also activated. On the contrary, when the user is leaving the building, the user may again swipe the electronic access card on the access card reader located within the building before exiting the building. Upon swiping the electronic access card, the security network database again matches the identification number associated with the electronic access card with the unique IP network identification address of the computer of the user. When there is a match, a shutdown instruction notification is transmitted to the computer associated with the unique IP network identification address found in the match. On receipt of the shutdown instruction notification signal, the computer is remotely switched off.

In another embodiment, a startup device (such as a mobile device having a startup application) may generate a startup instruction notification signal. The startup instruction notification signal is transmitted to a computer when the user along with the mobile device moves within a pre-defined proximity distance from the computer. On receipt of the startup instruction notification signal, the computer is remotely switched on. On the contrary, when the user along with the mobile device moves beyond the pre-defined proximity distance from the computer, a shutdown instruction notification signal is generated and transmitted to the computer. On receipt of the shutdown instruction notification signal, the computer is remotely switched off.

FIG. 1 shows components of an enterprise system 100. The system 100 may include system servers 102, system databases 104, analyst computers 106, first devices 108, second devices 110, web servers 112, and status boards 114. The system servers 102, the system databases 104, the analyst computers 106, the first devices 108, the second devices 110, the web servers 112, and the status boards 114 are connected to each other through a network 116. The examples of the network 116 may include, but are not limited to, private or public LAN, WLAN, MAN, WAN, and Internet. The network 116 may include both wired and wireless communications according to one or more standards and/or via one or more data transport mediums. The communication over the network 116 between the system servers 102, the system databases 104, the analyst computers 106, the first devices 108, the second devices 110, the web servers 112, and the status boards 114 may be performed in accordance with various communication protocols such as Transmission Control Protocol and Internet Protocol (TCP/IP), User Datagram Protocol (UDP), and IEEE communication protocols. In one example, the network 116 may include wireless communications according to Bluetooth specification sets, or another standard or proprietary wireless communication protocol. In another example, the network 116 may also include communications over a cellular network, including, e.g., a GSM (Global System for Mobile Communications), CDMA (Code Division Multiple Access), GPRS, and EDGE (Enhanced Data for Global Evolution) network.

In operation, when a first device 108, such as a user access card 108b, operated a user/employee, is swiped through or inserted into an access card reader located at an office workplace of the user, the access card reader detects information encoded on the first device 108 in the form of a magnetic stripe or bar code. The access card reader then transmits the read information from the first device 108 to a system server 102. Alternatively, the first device 108 may be a mobile device (e.g., a mobile phone 108a, or a smart watch 108c) configured to interact with the access card reader (e.g., using near-field communication) to transmit said information. The information may include user personal data, and credential data (such as device number) of the first device 108 for identifying the user. The information may further include credential data (such as IP address) associated with other devices of the user such as second devices 110. On receiving said information, the system server 102 may first determine whether the user is authorized for automatic startup of the second device 110 located within the office workplace. The system server 102 may compare said information with pre-stored information about the user entered during the system 100 setup identifying authorized users of the second device 110. When the system server 102 determines that the user is not authorized, the second device 110 remains powered down. The system server 102, upon determining that the user is authorized for remote startup, generates and transmits a startup instruction and/or a startup signal to an IP address of the second device 110 to power up the second device 110.

During the startup operation of the second device 110, the system server 102 may check whether various hardware components and software applications within the second device 110 have been loaded correctly or not. The system server 102 upon detecting any technical problem with the loading of the software applications or operation of the hardware components may flag a system error. The system error may correspond to a startup problem associated with the second device 110. The system server 102 may then activate a status board 114 on a user interface of an analyst computer 106. The status board 114 may indicate that the system error has been flagged. At the same time, the system server 102 may generate an alerts and a notification corresponding to the system error. The alert may contain various data fields capturing images of the system error on a user interface or a display screen of the second device 110. The image may capture the system error. The system sever 102 may store the alert into a system database 104 for further processing and correction of the system error. Analyst computers 106 may either receive the alert from the system server 102 or query and fetch the alert from the system database 104, and then present the alert to an analyst, for example, according to a priority level of the respective alert. In some implementations, the analyst computer 106 may generate an analyst queue model that may include a queue that may be populated with the various alerts stored in the system database 104. Each queue generated by the analyst computer 106 may contain the alerts of a certain risk level from various second devices 110. The system server 102 may determine a risk-level of each alert based on how likely a system error associated with the alert have occurred and/or a frequency of the system error for a particular user. The queue may also contain the alerts based on other attributes, such as the user information and/or the time-sensitive nature of the alert.

A first device 108 may be portable or non-portable device, such as a swipe card device, a smart phone, a smart watch, a gaming console, a personal digital assistant, a desktop computer, a laptop computer, a tablet computer, or the like. The first device 108 may include processors and various electronic components that perform operations according to programming instructions. The first device 108 is capable of communicating with a system server 102 and a web server 112 through a communications network 116 using wired or wireless communication capabilities. The user of the first device 108 may register their identification data and IP addresses of their workplace devices (such as second user devices 110) into a system database 104 to enable startup and shutdown activation services of the second user devices 110. The registration authenticates the user using the user's credential. Non-limiting examples of the first device 108 may include a telephone 108a (e.g., cellular telephone, smartphone), a smart card 108b (e.g., a swipe card, an access card), and a watch 108c (e.g., a smart watch).

The first device 108 may include input devices and output devices to allow user interaction with software programs hosted by the webserver 112 to assist users in hosting and performing operations of the software programs. In one example, the first device 108 may execute a browser application, which accesses and presents a web application executed by the webserver 112. Examples of the browser application may include, but are not limited to, Mozilla Firefox®, Microsoft® Internet Explorer, Google® Chrome, and Apple Safari®.

The first device 108 may be a mobile user device 108a, which is configured to track its location activity with respect to the second device 110, using a proximity location detection application, installed in an operating system of the mobile user device 108a. A location identification executable file may be installed on the first device 108, which assists a processor of the mobile user device 108a to track its location with respect to the second device 110. In one example, the executable file may be installed in an operating system of the first device 108. The executable file may track the location of the user using the first device 108 using a global positioning system technology. The executable file may also determine an identity of the user operating the first device 108 and identification data of the application being accessed by the user on the first device 108. The executable file may obtain the identity of the user by using a stored profile, cookies, IP address, request for input of an identification of the user from the system database 104, or other identification method. While the example described herein recites the operating system having the executable file, it is intended that the systems and methods can be integrated on a different application that uses the functionality of the executable file. In some alternative embodiments, for example on the mobile user device 108a, the functionality of the executable file may be executed by a separate application. In some embodiments, the executable file may extend or enhance functionality supported by the software application on the first device 108 and may be loaded at runtime of the first device 108.

The first device 108 may continuously monitor a distance between its current location and a location of the second user device 110. When the first device 108 determines that the first device 108 is within a predefined distance from the location of the second user device 110, the first device 108 may generate a startup activation signal. The first device 108 may then transmit the startup activation signal to the system server 102. The system server 102 may process the startup activation signal to determine a user identifier identifying the first device 108 and the second device 110. The system server 102 may then generate a startup instruction signal. The startup instruction signal may include instructions configured to remotely power up the second device 110. The system server 102 may transmit the startup instruction signal to an IP address of the second device 110 to power up the second device 110.

A second device 110 may be portable or non-portable device, such as a desktop computer, a laptop computer, a tablet computer, a smart phone, a smart watch, a gaming console, a personal digital assistant, or the like. The second device 110 may include processors and various electronic components that perform operations according to programming instructions. The second device 110 is capable of communicating with the system server 102 and the webserver 112 through the communications network 116 using wired or wireless communication capabilities. Non-limiting examples of the second device 110 may include a user desktop computer 110a and a user laptop computer 110b.

The second device 110 may include input devices and output devices to allow user interaction with software applications hosted by the webserver 112. The second device 110 may execute a browser application that accesses and presents a web application executed by the web server 112 and allows the user to perform operations. Examples of the browser application may include, but are not limited to, Mozilla Firefox®, Microsoft® Internet Explorer, Google® Chrome, and Apple Safari®.

The second device 110 is configured to receive a startup instruction signal from the system server 102. Upon the receipt of the startup instruction signal from the system server 102, the second device 110 begins to power up. During the powering up of the second device 110, cameras associated with the second device 110 may continually capture images and/or video of a display of the second device 110 and transmit the captured images and/or the video to the system server 102. The system server 102 may process data within the captured images and/or video to determine if there is a system error or a technical error with loading of various software applications on the second devices 110.

The second device 110 is configured to monitor its activity for a predefined length of time after being powered on. The activity may include occurrence of one or more I/O operations at the second device 110. If there is no activity monitored by the second device 110 for a predefined length of time after being powered on, the second device 110 may notify the system server 102 about the inactivity. Then the system server 102 may generate a shutdown instruction signal, which may include one or more instructions to power down the second device 110 as there is no activity.

A system server 102 may be a computing device comprising a processor and non-transitory machine-readable storage medium, and capable of performing the various tasks and processes described herein. Non-limiting examples of the system server 102 may include a desktop computer, a server computer, a laptop computer, a tablet computer, or the like. For ease of explanation, FIG. 1 shows a single computing device functioning as the system server 102. However, it should be appreciated that some embodiments may comprise any number of computing devices functioning as the system server 102 capable of performing the various tasks described herein.

The system server 102 may receive a startup activation signal from a first device 108. The system server 102 may then generate instructions and signals to remotely start the second device 110. In one non-limiting example, the system server 102 may use Wake-on-LAN (WOL) technique to transmit the instructions to the second device 110. The WOL technique may employ an Ethernet or token ring computer networking standard that allows the second device 110 to be turned on by a network message, which is included in the instructions. The system server 102 may implement the WOL using a wake-up frame having a wake-up packet, which is sent to the second device 110 within the network 116. The wake-up packet may contain the IP address of the second device 110, an identifying number built into each network interface card or the Ethernet device in the second device 110, that enables the second device 110 to be uniquely recognized, and addressed on the network 116. The second device 110, which is powered-down or turned off may contain network devices able to listen to incoming wake-up packets from the system server 102 while the second device 110 is powered down. If the wake-up packet is received that is directed to the IP address of the second device 110, the network interface card of the second device 110 signals a power supply or a motherboard of the second device 110 to initiate wake-up of the second device 110, in the same way that pressing the power button of the second device 110 would do. The second device 110 then begins to power up.

In operation, a WOL network adapter and a WOL enabled motherboard are provided the second device 110. Also, a remote management software is provided in the second device 110 and the system server 102. The WOL network adapter continually monitors the network 116 looking for the wake-up frames having the wake-up packets. The WOL network adapter may have a constant power source in order to boot up, which is usually from a special power supply that delivers a certain amount of power continually. The WOL network adapter also decodes the wake-up packets to determine if it is a wake-up packet. The WOL enabled motherboard may contain a complementary metal-oxide semiconductor that is designed to use WOL technology. The remote management software sends the wake-up frames to the second device 110. The remote management software is also configured to disable the WOL. The remote management software allows the scheduling of tasks that are needed and tells the second device 110 to shut down or go into sleep mode when done.

During the wakeup or the startup operation of the second user device 110, the system server 102 may detect an operational error occurred at the second device 110. The system server 102 may collect data associated with the operational error from the second device 110. The system server 102 may then execute various processes on the collected data to determine a particular scenario having attributes matching with attributes associated with the operational error. The system server 102 may include scenario attribute models that may indicate to the system server 102 whether a particular type of the operational error is potentially detected or ongoing. Scenario models may be computer files stored on the system server 102 or separate database device, such as a system database 104, and comprise a set of operational system error attributes that indicate a type of scenario of potential operational system errors. In such implementations, the system server 102 may identify applications on which the potential system errors were determined to identify matches to corresponding attributes in the scenario models.

Upon determining the operational error, the system server 102 may generate an alert status on the status board 114. The status board 114 may be pre-configured on the system server 102. In some embodiments, the status board 114 may be pre-configured on the analyst computer 106. For instance, the status board 114 may be pre-configured on any location on a user interface of the analyst computer 106 or as a button on a central processing unit of the analyst computer 106. The status board 114 may be an icon, which is generated and presented adjacent to a data field corresponding to the operational error displayed on the user interface of the analyst computer 106. The status board 114 may be displayed on the user interface of the analyst computer 106 as a pop-up window, a new window, or in any visually perceptible format. An analyst may then precisely point to and click on the status board 114 using a mouse, track pad, stylus, touchscreen, or other selection mechanism. When the status board 114 is displayed on the analyst computer 106 with a small screen (e.g., mobile device), the status board 114 may be greatly reduced in size. In addition, for the analyst computer 106 comprising a touchscreen, the user may have to click on the status board 114 using a finger on the touchscreen of the analyst computer 106.

The status board 114 may be displayed as a split-screen window on the user interface of the analyst computer 106 where at least one portion of the screen displayed on the analyst computer 106 may include a text box describing the identified operational error. Another portion of the screen displayed on the analyst computer 106 may provide an analyst with a list of known operational errors and a list of recommended solutions to resolve the operational errors. In one instance, the second user device 110 may automatically capture the image of its user interface at a time of detection of the system error, and then transmit the captured image to the system server 102, which is then transmitted by the system server 102 to the analyst computer 106.

A webserver 112 may be a computing device hosting a software application and/or a website accessible to second device 110 via the Internet. The webserver 112 may comprise a processor, and non-transitory machine-readable storage capable of executing the various tasks and processes described herein. Non-limiting examples of the webserver 112 may include workstation computers, laptop computers, server computers, laptop computers, and the like. While exemplary system 100 includes a single webserver 112, one having skill in the art would appreciate that in some embodiments the webserver 112 may include any number of computing devices operating in a distributed computing environment. The webserver 112 may operate independently or be associated with the first device 108, the second device 110 or the system server 102.

The webserver 112 may execute programs configured to host a software application and/or a website (e.g., Apache®, Microsoft IIS®), which may generate and serve various webpages on the second device 110. The webpages may be used to generate and access data stored on a system database 104 or any external databases. In some implementations, the webserver 112 may be configured to require user authentication based upon a set of user authorization credentials (e.g., username, password, biometrics, cryptographic certificate). In such implementations, the webserver 112 may access the system database 104 configured to store user credentials, which the webserver 112 may be configured to reference in order to determine whether a set of entered credentials purportedly authenticating the user match an appropriate set of credentials that identify and authenticate the user. Similarly, in some implementations, the webserver 112 may generate and serve webpages to the first device 108 and the second device 110 based upon a user role (e.g., employee) within the system 100. In such implementations, the user role may be defined by data fields in user records stored in the system database 104, and authentication of the user and the user role may be conducted by the webserver 112 by executing an access directory protocol. The webserver 112 may then be instructed to generate the webpage command and access or generate data stored in the system database 104, according to the user role defined by the user record in the system database 104.

An analyst computer 106 may be a computing device comprising a processor and capable of performing the various processes and tasks described herein. Non-limiting examples of the analyst computer 106 may include laptops, desktops, servers, tablets, and smartphones. The analyst computer 106 may be coupled via one or more internal or external networks 116 to the system database 104. The analyst computer 106 may be further coupled to the system server 102 and the second device 110 such that the analyst computer 106 allows an analyst to receive alerts from the system server 102 and/or the second device 110. Software executed by the analyst computer 106 permits an analyst to select an alert from the system database 104 and then review or update data stored in the system database 104 record for the selected alert. For instance, the analyst computer 106 may produce an interactive user interface that allows the analyst to navigate the alert information associated with the second devices 110, and may allow the analyst to generate, update, and monitor records of ongoing requests generated automatically by the system server 102 and/for the errors of the second device 110.

The system server 102 may analyze the errors, and then classify the errors based on the subject matter (e.g., type of error) or procedural role (e.g., time-sensitive system error). The analyst computer 106 may then receive alerts corresponding to the errors. The alerts are related to subject matter (e.g., type of error) or procedural role (e.g., time-sensitive error) of the respective analyst. In some implementations, the alerts may have one data field indicating a nature of the error and another data field indicating a time-sensitive nature or user-sensitive nature of the error. Based on the data fields associated with the alert, the analyst computer 106 may receive the alerts having subject matter or procedural data fields associated with the analyst credentials. For instance, the credentials of an analyst specializing in time sensitive alerts would indicate to the analyst computer 106 that the analyst computer 106 should retrieve and present the alerts having a data field indicating that the particular alert is time sensitive.

The alerts may be stored into dedicated databases or sub-databases of the system database 104, where each sub-database is configured to store the alerts with certain types of alerts. In such implementations, the analyst computer 106 is limited to accessing certain sub-databases according to the credentials of the analyst operating the analyst computer 106. Similarly, the analyst computer 106 may receive updates or notification messages that the analyst computer 106 presents on a user interface to the analyst. The system server 102 may trigger and transmit a notification to each analyst computer 106 having analyst credentials with access attributes indicating a role of the analyst. For instance, an analyst may have credentials with attributes that indicate that the analyst specializes in handling time-sensitive alerts. When a new alert is generated or an existing alert is updated with a data field indicating that the alert may be time sensitive, the system server 102 may then transmit a notification message to the analyst computer 106.

The analyst computer 106 may have a user interface that allows an analyst to mark or tag the alert. A data field in a record of the alert is then updated to reflect the tag inputted by the analyst computer 106. The tag may reflect an analyst's concern that the alert may contain data fields that could be cross-referenced, and found in another alert. The system server 102 may then perform various forms of processing on the data fields of the alert, such as identifying which, if any, other alerts contain the same data in the corresponding data fields.

A system database 104 may be hosted on a number of computing devices comprising a non-transitory machine-readable storage medium, and capable of performing the various tasks described herein. As shown in FIG. 1, the system database 104 is accessed by the system server 102 and devices of the enterprise system 100 via one or more networks 116. The system database 104 is hosted on a same physical computing device functioning as the system server 102. For example, the system database 104 is in communication with a processor of a system server 102, where the processor is capable of executing various commands of the system 100. The system databases 104 may be part of the system server 102 or a separate component in communication with the system server 102.

The system database 104 is capable of storing data associated with users of a company. The data may include user records such as usernames, passwords, biometrics, encryption certificates of the first device 108 and/or the second device 110, user access card data, user account data, user roles, or user permissions; document records that may comprise machine-readable computer files (e.g., word processing files), parsed portions of such computer files, or metadata associated with computer files; and application data that may include software instructions executed by the system server 102 or data used by the applications executed by the system server 102. The system database 104 may further store data associated with detected and known errors and alerts in plain format and encrypted version containing various fields that are associated with the communication channel and data associated with the errors and alerts.

Figure 2:
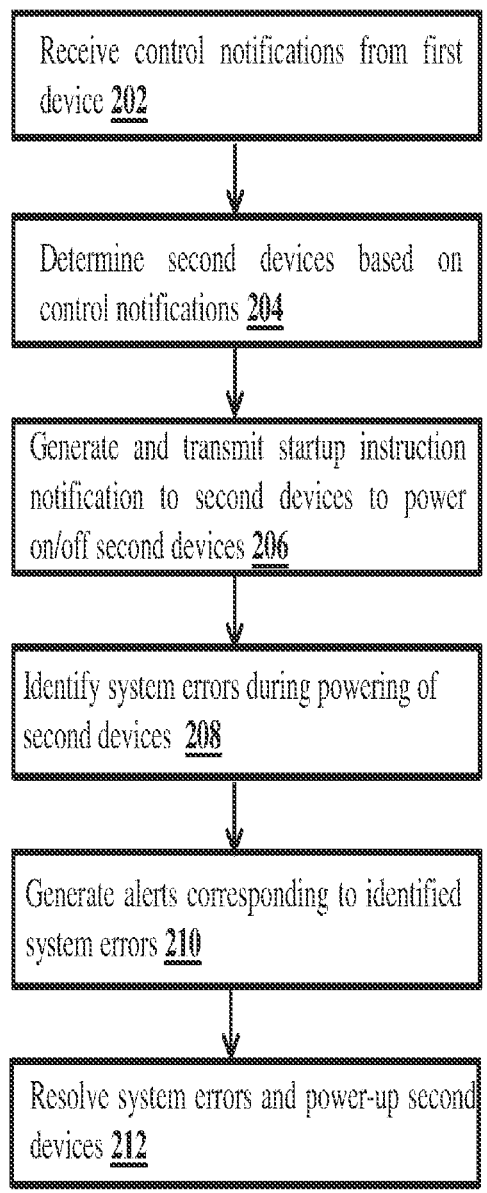
FIG. 2 shows execution of a method for automatically powering up one set of computing devices based on instructions from another set of computing devices in an enterprise system, according to an embodiment.

FIG. 2 shows execution steps of automatically powering up one set of computing devices based on instructions from another set of computing devices in a system, according to a method 200. The method 200 shown in FIG. 2 comprises execution steps 202, 204, 206, 208, 210, and 212. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the system server described herein.

In a first step 202, a server may receive a set of one or more control notifications from a first device operated by a user. The first device may generate the control notifications, and then transmit the control notifications to the server, upon determining that a location associated with the first device satisfies a threshold value. For instance, when the location of the first device is within a threshold distance from a location of a second device of the user, then the first device may generate the control notifications, which are then transmitted to the server.

The first device may generate the control notifications upon occurrence of a predetermined number of scenarios. For example, when the first device is an access card, and when the user swipes the access card against a card reader, the access card and/or the card reader may generate a control notification. The access card and/or the card reader may then transmit the control notification to the server. The server may process the control notification and identify a user identifier associated with the control notification. The user identifier may include device information associated with all devices of the user such as the access card and the second device (such as a desktop computer).

In some cases, when the user swipes a first access card against a first card reader, then a second step of authentication of a two-factor authentication process may have to be performed. The two-factor authentication process is an extra layer of security for the user designed to ensure that the user is the only person who can access their devices. The second step of the two-factor authentication process may include swiping the first access card against a second card reader or swiping a second access card against the second card reader. The access cards and/or the card readers may then transmit the control notification to the server. The server may process the control notification and identify a user identifier associated with the control notification. The user identifier may include device information associated with all devices of the user such as one or more access cards and the second device (such as a desktop computer). For instance, the server may require an authentication (or authorization) from multiple user devices before proceeding.

In another example, a first device is a mobile phone. The mobile phone may include a location detection application such as a GPS location software application. The mobile phone may continuously monitor a distance between a current location of the mobile phone and a location of a second device (such as a desktop computer). When the mobile phone moves within a predefined distance from the location of the desktop computer, the mobile phone may generate a control notification. The mobile phone may transmit the control notification to the server. The server may process the control notification and determine a user identifier associated with the control notification. The user identifier may include device information associated with all devices of the user such as the mobile phone and the desktop computer.

In some cases, when the mobile phone moves within a predefined distance from the location of the desktop computer, a second step of authentication of a two-factor authentication process may have to be performed. The second step of the two-factor authentication process may include transmitting a text message on the mobile phone. When the user accepts and acknowledges the text message, the mobile phone may generate a control notification. The mobile phone may transmit the control notification to the server. The server may process the control notification and determine a user identifier associated with the control notification. The user identifier may include device information associated with all devices of the user such as the mobile phone and the desktop computer.

In a next step 204, a server may query a system database using the user identifier as an input query. The system database may store electronic identifiers of all second devices associated with user identifier. In response to the query, the server may retrieve the electronic identifier associated with the second device. The electronic identifier may include an internet protocol (IP) address, device number, etc.

In a next step 206, a server may generate a startup instruction notification. The startup instruction notification may include instructions to power up the second device. The server may then transmit the startup instruction notification to the IP address of the second device to power up the second device. Upon the receipt of the startup instruction notification, the second device may begin to power up.

The startup instruction notification may include a wake-up frame having a wake-up packet. The wake-up packet may contain the IP address of the second device, an identifying number built into each network interface card or the Ethernet device in the second device, that enables the second device to be uniquely recognized, and addressed on the network. The second device may contain network devices able to listen to incoming wake-up packets from the server while the second device is powered down. If the wake-up packet is received that is directed to the IP address of the second device, the network interface card of the second device signals a motherboard of the second device to initiate wake-up of the second device, in the same way that pressing the power button of the second device would do. The second device then begins to power up.

The powering up process of the second device may also include execution of startup tasks on the second device. The startup tasks may include updating and running a first predetermined list of applications such as a virus protection programs, antispyware programs, and preliminary virus scans. The startup tasks may include disabling a second predetermined list of applications. The first and the second predetermined list of applications may be determined according to a role of user or as instructed by the user. For example, the user may customize the first and the second predetermined list of applications, which have to be enabled or disabled during the powering up process. The server may determine the role of user from an internal database based on information associated with the user identifier.

In a next step 208, a server may monitor loading of software applications and programs during powering up process of the second device. The server may also monitor operations of various hardware components of the second device during powering up process of the second device.

During the powering up process, the server may scrape a graphical user interface of the second device. Based on the scraping of the graphical user interface, the server may identify one or more system errors associated with the powering up process of the second device displayed on the graphical user interface. In some instances, the second device may itself identify the system errors associated with its powering up process displayed on the graphical user interface. To determine the system error, a server may search for an indicator, which may indicate the system error. For instance, the server may continually scrape and/or parse files of the second device for extracting loading data associated with various software applications. In some cases, the server may continually scrape user interface of the second device for extracting loading data results associated with various software applications.

For example, the server may parse the user interface to detect keywords. The keywords may correspond to one or more known terms. The known terms are associated with an indicator of the system error. The known terms may include failed, update, etc. When the server identifies the known terms in a sentence "loading failed. Update new version of ABC software" displayed on the user interface during the startup process, the server may conclude that there is a technical error with the loading of the software's. The server may then capture images of the user interface. To capture the images, the server may trigger an internal camera or an external camera to capture the images of the user interface. The images may capture information associated the identified system error. In some cases, the camera may continually capture images of the user interface from the time the startup process begins at the second device until the system error is detected. A processor associated with the camera may transmit the captured images to the server.

In a next step 210, a server may reboot the second device to correct the system error. In some configurations, the server may only reboot the computer upon receiving authorization from one or more user devices (e.g., user's wearable watch or mobile device). The server may also generate an alert associated with the system error. The server may generate the alert when information associated with the system error satisfies a predetermined threshold. In one example, when the server identifies the system error in multiple user devices of multiple users, the server may generate an alert for the identified system server. The multiple user devices must be at least five user devices. In another example, when the system error associated with the second device is a known error, and then the server may generate the alert. The alert may include log files and machine-readable code containing data fields describing the system error, the second device, information captured in the images.

The server may process data associated with the alert based on a data model to determine an alert probability score. The data model may relate to a particular type of the system error. The data model may be an alert-generation model. The alert-generation model may be a non-linear statistical data model. The non-linear statistical data model may include neural networks, decision trees, Bayesian networks, genetic algorithms, or other types of non-linear statistical data models.

In a next step 212, a server may transmit the alert to an analyst computer for correcting the corresponding system error. The server may display the alert on a user interface of the analyst computer as a pop-up window, a new window, or in any visually perceptible format. The server may then generate a status board associated with the alert on the user interface or any other portion of the analyst computer. The status board may display a current status of the alert by switching on a light element from multiple light elements on the status board. The server may select a color of the light element depending upon the current status of the alert. For example, when the alert is received, a red color light is activated at the status board; when the alert is being worked upon by the analyst, a yellow color light is activated at the status board; and when the alert is resolved by the analyst, a green color light is activated at the status board.

The analyst computer may continually transmit a current status of correcting the system error associated with the alert to the server, the first device, and the second device. In some cases, the analyst computer may initiate a chat session with the user operating the first device and/or an admin associated with the server. During the chat session, the analyst computer may transmit the current status and/or receive information from the user/admin. Based on the current operating status, the server may activate a specific color light element on the status board. The server may then transmit the current status of the alert to the user on the first device and/or the second device.

When the system error is corrected, the analyst computer may notify the server. The server may then power on the second device. In some configurations, the server may power on the second device and then lock the second device. When the user arrives at the location of the second device, the user may waste no time in startup processes, and may directly unlock the second device by logging in using username and password, and thus start using the second device. The server may monitor activity at the second device for a predefined length of time after powering on the second device. The activity may include I/O operations at the second device. If there is no activity for the predefined length of time, the server may then generate a shutdown instruction notification, which may include instructions to power down the second device. The server may transmit the shutdown instruction notification to the second device. The second device will then shut down. In some cases, the server may transmit the shutdown instruction notification to the first device (such as a watch or a mobile device). Then the first device may authorize an analyst computer operated by an analyst to the shutdown down the second device. The analyst computer may then execute instructions to shut down the second device.

The shutdown instruction notification may include a shutdown frame having a shutdown packet. The shutdown packet may contain the IP address of the second device, an identifying number built into each network interface card or the Ethernet device in the second device, that enables the second device to be uniquely recognized, and addressed on the network. The second device may contain network devices able to listen to incoming shutdown packets from the server while the second device is powered up. If the shutdown packet is received that is directed to the IP address of the second device, the network interface card of the second device signals a motherboard of the second device to initiate shutdown of the second device, in the same way that pressing the power button of the second device would do. The second device then begins to turn off.

Figure 3:
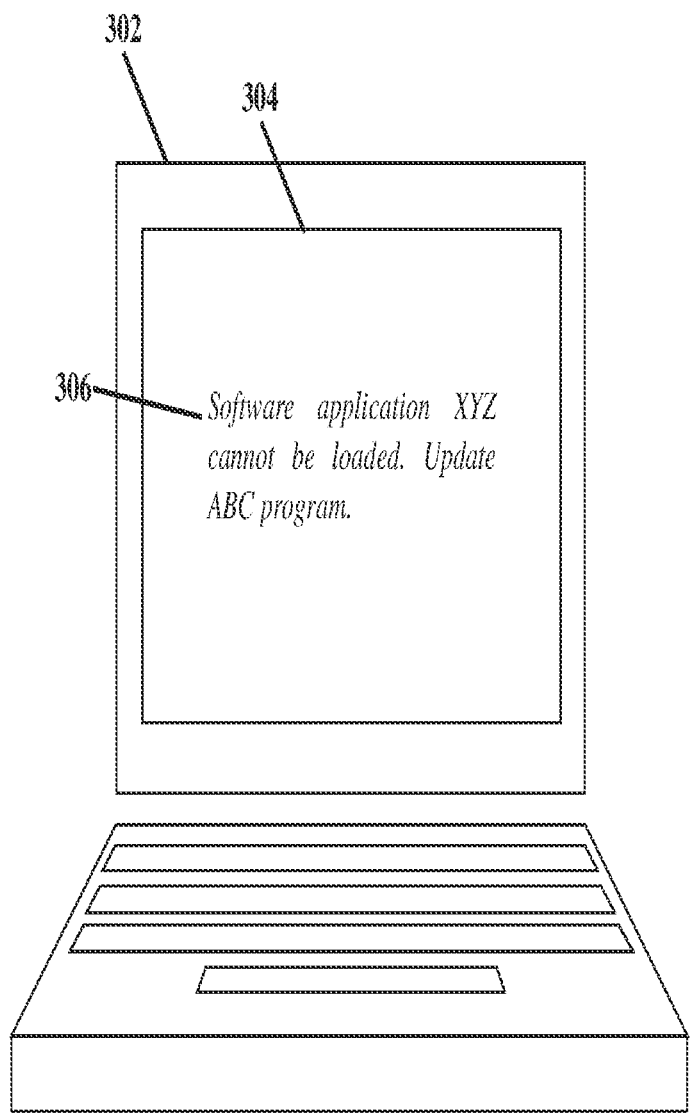
FIG. 3 shows a user computing device having a graphical user interface displaying a system error, according to an embodiment.

FIG. 3 shows a user computing device 302. The user computing device 302 may include an optical sensor (for example, a camera or imaging technology) to capture images and video, an audio input component such as a microphone, a mechanical input component such as button or key selection sensors, a touch pad sensor, a touch-sensitive sensor, a motion sensor, and a pointing device such as a joystick, a touch pad, a touch screen, a fingerprint sensor, or a pad for an electronic stylus. A server is coupled to a processor of the user computing device 302, which is further coupled to the camera. The server may activate the camera to capture images and video.

The user computing device 302 may include an output component such as a graphical user interface 304. The graphical user interface 304 may be a cathode ray tube, a liquid crystal display, an OLED display, an AMOLED display, a super-AMOLED display, a plasma display, an incandescent light, a fluorescent light, or a front or rear projection display. The graphical user interface 304 may be a touch screen device.

In operation, when a server initiates a remote startup process of the user computing device 302 so that the user computing device 302 is ready for use by a user when the user arrives at a location of the user computing device 302, software applications on the user computing device 302 are being loaded. During the startup process or after the user computing device 302 is remotely started, some of the software programs and applications may not load properly or there may be a problem with some hardware components of the user computing device 302. A message associated with the problem may display on the graphical user interface 304 of the user computing device 302. A server may scrape the graphical user interface 304 of the user computing device 302 and detect a message associated with a system error 306 on the user computing device 302. The message associated with the system error 306 may include information related to failed loading of a particular software program during the compilation of various software programs installed in an operating system of the user computing device 302. The server may then trigger a camera to capture a snapshot of the graphical user interface 304. The snapshot may include an image. The image may include all the information related to the system error 306. The server may then generate an alert. The alert may include all the information associated with the system error 306 and the captured image. The server may then transmit the alert 316 to an analyst computer. The analyst computer may then process all the received information, and resolve the system error 306. When the system error 306 is corrected, the user computing device 302 is remotely powered on and is ready for use by the user when the user arrives at the location of the user computing device 302.

Example

In one non-limiting example, when a user reaches his/her office building, the user swipes an access card on an access card reader located at a gate of the office building. Upon successful and valid swiping of the access card, a backend server may transmit a notification to a watch or a mobile device of the user. The notification may include a message regarding permission to remotely startup a user's desktop computer located within the office building. When the user acknowledges and approves the notification, the backend server transmits startup instructions to the user's desktop computer, and the desktop computer is then remotely powered on.

When the desktop computer is powered on, the desktop computer has at least some disabled features (e.g., locked) in order to prevent unauthorized users from operating the powered on desktop computer. For instance, during the powering process of the user desktop computer, a predetermined list of software applications are enabled and/or disabled. The predetermined list of software applications are selected by the user, and stored in a database. The backend server monitors the powering on process of the user's desktop computer. When there is any hardware or software error detected during the powering on process of the user's desktop computer, the backend server may generate an alert corresponding to the detected error. The backend server may then transmit the alert to an analyst computer. The analyst computer may then fix the error, and the user's desktop computer is correctly powered on or rebooted. When the user accesses the user's desktop computer, the user may enter credentials such as username and password, and the user's desktop computer is unlocked and ready for use by the user.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via memory sharing, message passing, token passing, network transmission, or the like.

The actual software code or specialized control hardware used to implement these systems and methods is not a limiting factor of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and without limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art of making or using the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method, comprising:
receiving, by a server, a notification indicating a user identifier associated with a first device and indicating that a proximity between the first device and a workplace computing device satisfies a proximity threshold;
querying, by the server and in response to the notification, a plurality of electronic identifiers corresponding to a plurality of workplace computing devices to locate a correspondence between the user identifier associated with the first device and an electronic identifier of the plurality of electronic identifiers, the electronic identifier corresponding to the workplace computing device;
generating, by the server and in response to locating the correspondence between the user identifier and the electronic identifier, a startup instruction comprising instructions configured to initiate a startup routine of the workplace computing device;
transmitting, by the server, the startup instruction to an electronic identifier address associated with the electronic identifier corresponding to the workplace computing device; and
in response to the startup instruction, executing the startup routine to boot up the workplace computing device.

2. The computer-implemented method of claim 1, comprising:
identifying, by the server and in response to locating the correspondence between the user identifier and the electronic identifier, a system error associated with the workplace computing device; and correcting the system error before or during the startup routine.

3. The computer-implemented method of claim 2, comprising:
generating, by the server, an alert corresponding to the system error;
transmitting, from the server and to an analyst computer, the alert corresponding to the system error; and
correcting, via the analyst computer, the system error before or during the startup routine.

4. The computer-implemented method of claim 2, comprising:
scraping, by the server and in response to locating the correspondence between the user identifier and the electronic identifier, a graphical user interface of the workplace computing device to extract display data indicative of features displayed on the graphical user interface; and
identifying, by the server, the system error based on the display data.

5. The computer-implemented method of claim 4, comprising executing one or more software programs installed in an operating system of the workplace computing device in response to executing the startup routine, such that the features displayed on the graphical user interface are produced by the one or more software programs.

6. The computer-implemented method of claim 1, comprising:
generating the notification via a card reader configured to detect an access card including the user identifier and corresponding to the first device; and
transmitting the notification from the card reader to the server.

7. The computer-implemented method of claim 1, comprising:
monitoring, via the server, the workplace computing device for a predefined period of time after the startup routine is completed;
generating, via the server and in response to an absence of user activity at the workplace computing device for the predefined period of time, a shutdown instruction comprising instructions to power off the workplace computing device;
transmitting, via the server, the shutdown instruction to the electronic identifier address associated with the electronic identifier corresponding to the workplace computing device; and
executing a shutdown routine in response to the shutdown instruction to power off the workplace computing device.

8. The computer-implemented method of claim 1, wherein the notification comprises a first notification indicating the user identifier and a second notification indicating that the proximity between the first device and the workplace computing device satisfies the proximity threshold.

9. A non-transitory, computer readable medium comprising instructions stored thereon that, when executed by at least one processor, cause the at least one processor to:
receive a notification indicating a user identifier associated with a first device and indicating that a proximity between the first device and a workplace computing device satisfies a proximity threshold;
querying, in response to the notification, a plurality of electronic identifiers corresponding to a plurality of workplace computing devices to locate a correspondence between the user identifier associated with the first device and an electronic identifier corresponding to the workplace computing device;
generating, in response to locating the correspondence between the user identifier and the electronic identifier, a startup instruction comprising instructions configured to boot up the workplace computing device; and
transmitting the startup instruction to an electronic identifier address associated with the electronic identifier corresponding to the workplace computing device to cause the workplace computing device to execute the startup routine to boot up the workplace computing device.

10. The non-transitory, computer readable medium of claim 9, wherein the instructions, when executed by the at least one processor, cause the at least one processor to:
identify, in response to locating the correspondence between the user identifier and the electronic identifier, a system error associated with the workplace computing device; and
correct the system error before or during the startup routine, or generate and transmit an error correction instruction to the workplace computing device to cause the workplace computing device to correct the system error before or during the startup routine.

11. The non-transitory, computer readable medium of claim 10, wherein the instructions, when executed by the at least one processor, cause the at least one processor to:
scrape, in response to locating the correspondence between the user identifier and the electronic identifier, a graphical user interface of the workplace computing device to extract display data indicative of features displayed on the graphical user interface; and
identify the system error based on the display data.

12. The non-transitory, computer readable medium of claim 9, wherein the instructions, when executed by the at least one processor, cause the at least one processor to:
monitor the workplace computing device for a predefined period of time after the startup routine is completed;
generate, in response to an absence of user activity at the workplace computing device for the predefined period of time, a shutdown instruction comprising instructions to power off the workplace computing device; and
transmit the shutdown instruction to the electronic identifier address associated with the electronic identifier corresponding to the workplace computing device to cause the workplace computing device to execute a shutdown routine to power off the workplace computing device.

13. The non-transitory, computer readable medium of claim 9, wherein the instructions, when executed by the at least one processor, cause the at least one processor to generate the notification in response to detecting an access card including the user identifier and corresponding to the first device.

14. The non-transitory, computer readable medium of claim 9, wherein the instructions, when executed by the at least one processor, cause the at least one processor to:
receive an additional notification indicating an additional user identifier associated with a second device and indicating that an additional proximity between the second device and an additional workplace computing device satisfies an additional proximity threshold;
query, in response to the additional notification, the plurality of electronic identifiers corresponding to the plurality of workplace computing devices to locate an additional correspondence between the additional user identifier associated with the second device and an additional electronic identifier corresponding to the additional workplace computing device;

generate an additional startup instruction comprising additional instructions configured to boot up the additional workplace computing device; and transmit the additional startup instruction to an additional electronic identifier address associated with the additional electronic identifier corresponding to the additional workplace computing device to cause the additional workplace computing device to execute the additional startup routine to boot up the additional workplace computing device.

15. A system, comprising:

a workplace computing device; and a server communicatively coupled to the workplace computing device and configured to:

receive a notification indicating a user identifier associated with a first device and indicating that a proximity between the first device and the workplace computing device satisfies a proximity threshold;

query, in response to the notification, a plurality of electronic identifiers corresponding to a plurality of workplace computing devices to locate a correspondence between the user identifier associated with the first device and an electronic identifier corresponding to the workplace computing device;

generate, in response to locating the correspondence between the user identifier and the electronic identifier, a startup instruction comprising instructions configured to boot up the workplace computing device; and transmit the startup instruction to an electronic identifier address associated with the electronic identifier corresponding to associated with the workplace computing device to cause the workplace computing device to execute the startup routine to boot up the workplace computing device.

16. The system of claim 15, comprising the first device, wherein the first device comprises an access card.

17. The system of claim 15, comprising a card reader configured to:

detect an access card corresponding to the first device; and generate the notification in response to detecting the access card.

18. The system of claim 15, wherein the server is configured to receive the notification from a mobile phone or smart watch corresponding to the first device.

19. The system of claim 15, wherein the server is configured to identify, in response to locating the correspondence between the user identifier and the electronic identifier, a system error associated with the workplace computing device.

20. The system of claim 19, wherein the server is configured to:

generate an alert corresponding to the system error; and transmit the alert to an analyst computer of the system, wherein the analyst computer is configured to:

correct the system error before or during the startup routine; or cause the workplace computing device to correct the system error before or during the startup routine.

* * * * *